(12) United States Patent
Hundley et al.

(10) Patent No.: US 11,448,248 B2
(45) Date of Patent: Sep. 20, 2022

(54) PANEL MOUNTED GLASS BRACKET ASSEMBLY

(71) Applicant: HNI Technologies Inc., Muscatine, IA (US)

(72) Inventors: Evan M. Hundley, Eldridge, IA (US); Samuel A. Herrmann, Muscatine, IA (US); Trevor M. Sloat, Muscatine, IA (US); Jacob C. Hovey, Muscatine, IA (US); Ryan M. Roberts, Davenport, IA (US)

(73) Assignee: HNI TECHNOLOGIES INC., Muscatine, IA (US)

( * ) Notice: Subject to any disclaimer, the term of this patent is extended or adjusted under 35 U.S.C. 154(b) by 0 days.

(21) Appl. No.: 16/989,097

(22) Filed: Aug. 10, 2020

(65) Prior Publication Data
US 2022/0042529 A1 Feb. 10, 2022

(51) Int. Cl.
*F16M 11/00* (2006.01)
*F16B 2/06* (2006.01)
*F16B 5/06* (2006.01)

(52) U.S. Cl.
CPC ............ *F16B 2/065* (2013.01); *F16B 5/0607* (2013.01)

(58) Field of Classification Search
CPC ...... F16B 5/0607; F16B 2/065; F16B 5/0692; F16B 2/0621; F16B 5/0621; E04B 2/7416; E04B 2/74
See application file for complete search history.

(56) References Cited

U.S. PATENT DOCUMENTS

| | | | | |
|---|---|---|---|---|
| 2,551,157 | A * | 5/1951 | Price | G09F 7/18 248/488 |
| 2,721,718 | A * | 10/1955 | Wagner | A01K 97/05 248/214 |
| 4,640,045 | A * | 2/1987 | Nesbitt | A01G 9/04 47/67 |
| 5,813,642 | A * | 9/1998 | Warren | E04H 13/003 248/229.15 |
| 5,822,918 | A * | 10/1998 | Helfman | A47H 27/00 47/39 |
| 6,012,690 | A * | 1/2000 | Cohen | A47G 7/044 248/214 |
| 8,561,355 | B2 * | 10/2013 | Canavarro | E04B 2/7416 52/36.1 |

(Continued)

*Primary Examiner* — Amy J. Sterling
(74) *Attorney, Agent, or Firm* — Faegre, Drinker, Biddle & Reath, LLP

(57) ABSTRACT

A bracket for securing a panel is provided, the bracket including a panel contact member including an interface portion. Also provided are a first clamp member having a first clamp surface contact portion and a first clamp adjustable portion operable to interface with the panel contact member interface portion and a second clamp member having a second clamp surface contact portion positioned such that it is facing toward the first clamp surface contact portion of the first clamp when the first clamp adjustable portion is interfacing with the panel contact member interface portion, such that the first and second clamp surface contact portions are facing inward towards each other. A securing member is operable to secure the first clamp member to the panel contact member, the securing member positioned substantially perpendicular to the first and second clamp surface contact portions.

17 Claims, 10 Drawing Sheets

(56) References Cited

U.S. PATENT DOCUMENTS

| | | | |
|---|---|---|---|
| 10,420,430 B2 * | 9/2019 | Scott | F16M 11/425 |
| D909,193 S * | 2/2021 | Canavarro | F16M 13/02 |
| | | | D8/394 |
| 10,989,237 B1 * | 4/2021 | Wittsche | F16B 2/22 |
| D930,417 S * | 9/2021 | Dowding | A01K 97/05 |
| | | | D6/714 |

* cited by examiner

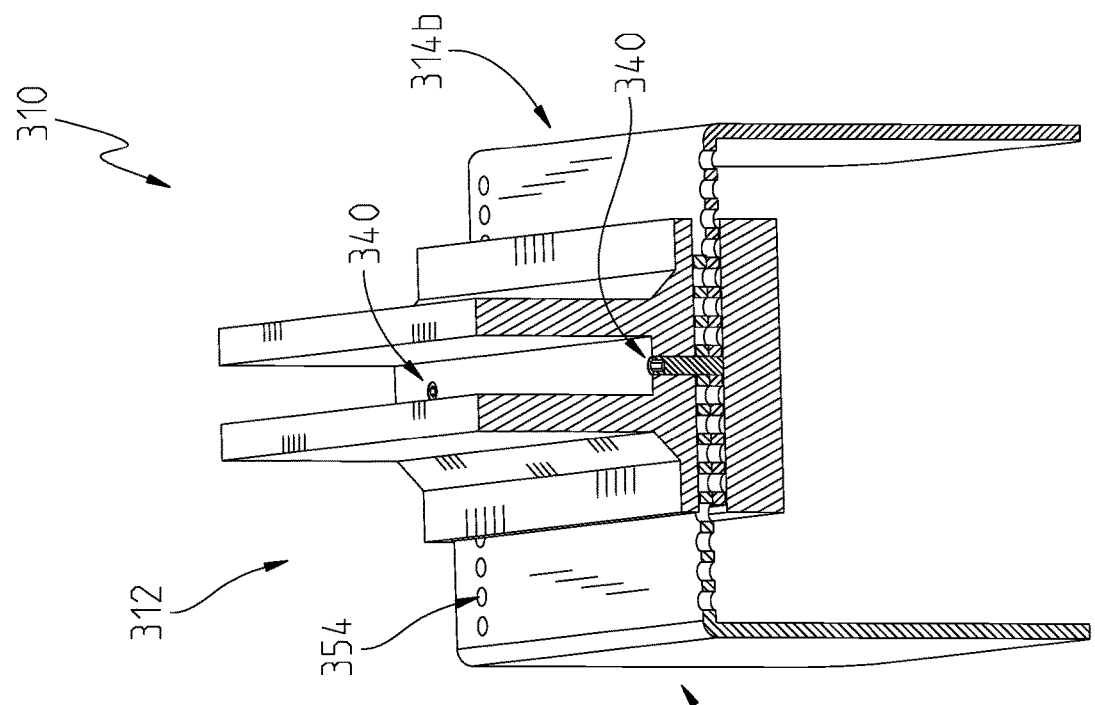
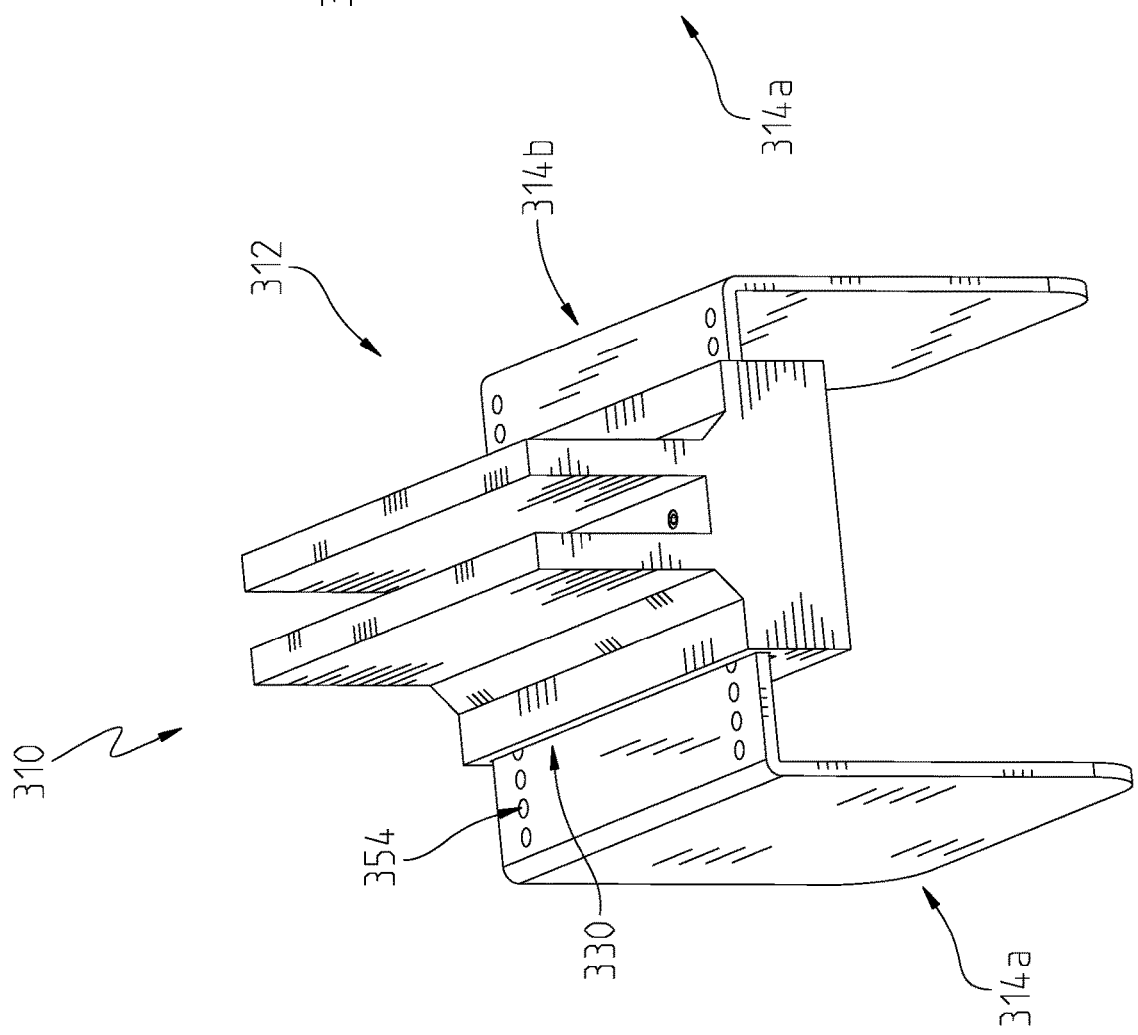

US 11,448,248 B2

PANEL MOUNTED GLASS BRACKET ASSEMBLY

TECHNICAL FIELD

The present disclosure relates to a bracket for mounting a panel. More particularly, the present disclosure relates to an adjustable bracket for mounting a panel such as a glass panel to objects of varying thicknesses.

BACKGROUND

Panels may be mounted to a variety of surfaces for creating barriers, displaying objects or graphics, or otherwise. For example, panels may be installed to create barriers between work spaces in modular work spaces or moveable wall systems. Panels may also be implemented as a safety precaution such as against contamination and spread of transmissible disease or illness.

Some problems associated with mounting panels to surfaces is the variety of widths and profiles of the surfaces. Fixed brackets must be specifically designed to properly interface with each surface. For example, a small fixed bracket must be specifically designed for a modular workspace with 1-inch walls and a large fixed bracket must be specifically designed for a modular workspace with 2-inch walls. Furthermore, the profile of the surface to which the panel is to be mounted may further necessitate unique designs of the bracket.

The forces exerted on the bracket by the panel require the bracket to be firmly affixed to the surface. One problem associated with adjustable brackets is the ability to secure the adjustable bracket to the surface sufficiently to withstand those forces. For example, some adjustable brackets require a user to manually position the adjustable bracket with respect to the surface and then secure the bracket in that position. One problem may be that the user is unable to manually create sufficient contact with the surface to properly secure the bracket to the surface. Another problem may be that the securing may slip over time allowing the bracket to slowly adjust away from securement. This may occur, for example, in adjustable brackets relying on pressure between two components to create high levels of friction (e.g., a set screw applying sufficient pressure between metal components) to prevent movement of the adjustable bracket.

Hence, in light of the aforementioned, there is a need for an improved adjustable bracket, by virtue of its design and components, that would be able to overcome or at least minimize some of the aforementioned prior art problems.

SUMMARY

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The accompanying drawings are included to provide a further understanding of the disclosure. The drawings incorporated in and constituting a part of this specification illustrate embodiments of the disclosure, and together with the description, serve to explain the principles of the disclosure, wherein like numerals denote like elements and wherein:

FIG. 9 is a perspective view of an embodiment of an adjustable bracket where a securing member is operable to be engaged in a vertical position in accordance with the present disclosure; and FIG. 10 is an alternative perspective, sectional view of the adjustable bracket of claim 9 showing the securing member in accordance with the present disclosure.

DETAILED DESCRIPTION

Figure 1:
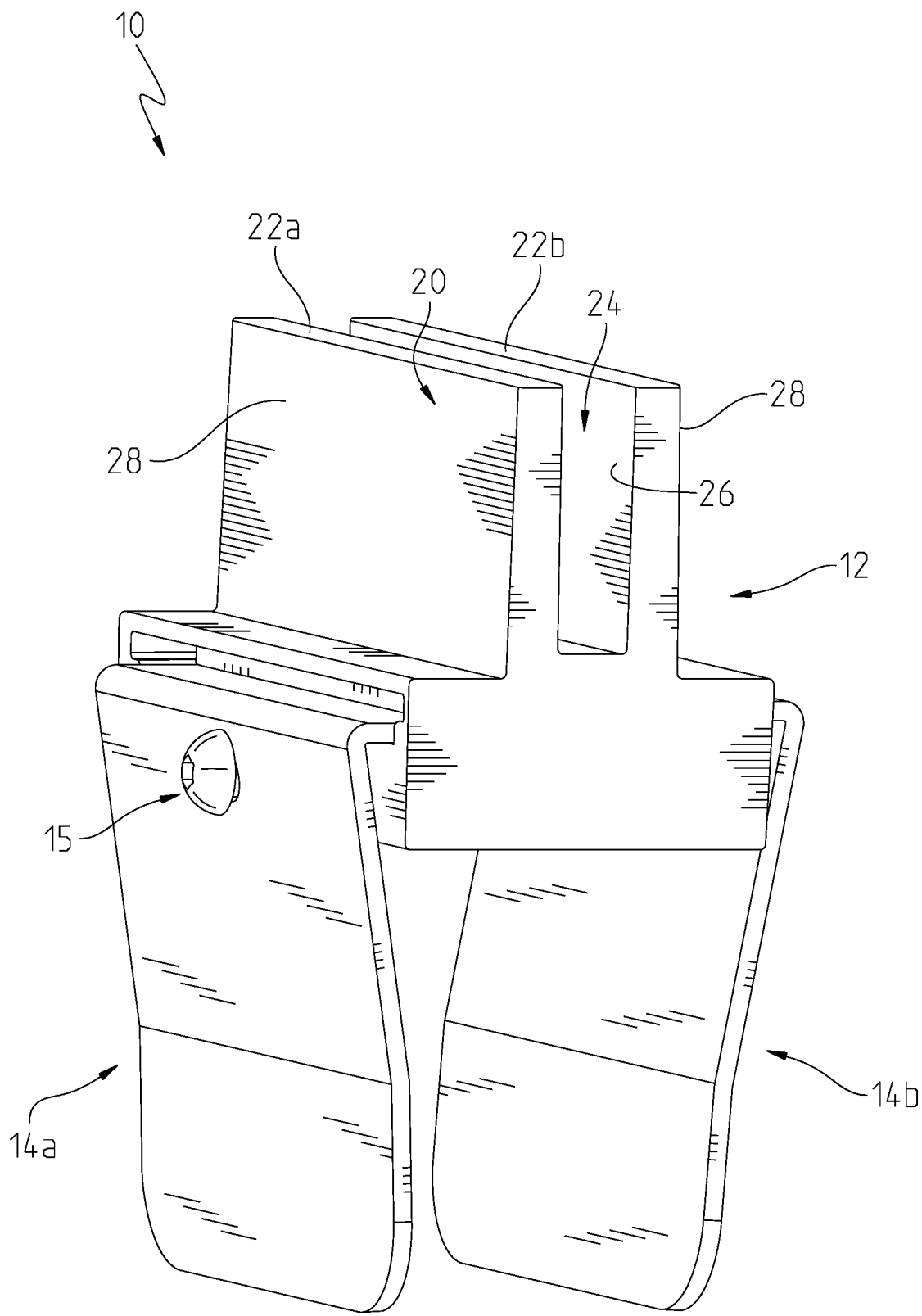
FIG. 1 illustrates a perspective view of an embodiment of an adjustable panel mount bracket assembly having a panel contact member, clamp members, and a securing member in accordance with the present disclosure.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

Persons skilled in the art will readily appreciate that various aspects of the present disclosure can be realized by any number of methods and systems configured to perform the intended functions. Stated differently, other methods and systems can be incorporated herein to perform the intended functions. It should also be noted that the accompanying drawing figures referred to herein are not all drawn to scale, but can be exaggerated to illustrate various aspects of the present disclosure, and in that regard, the drawing figures should not be construed as limiting.

Figure 2:
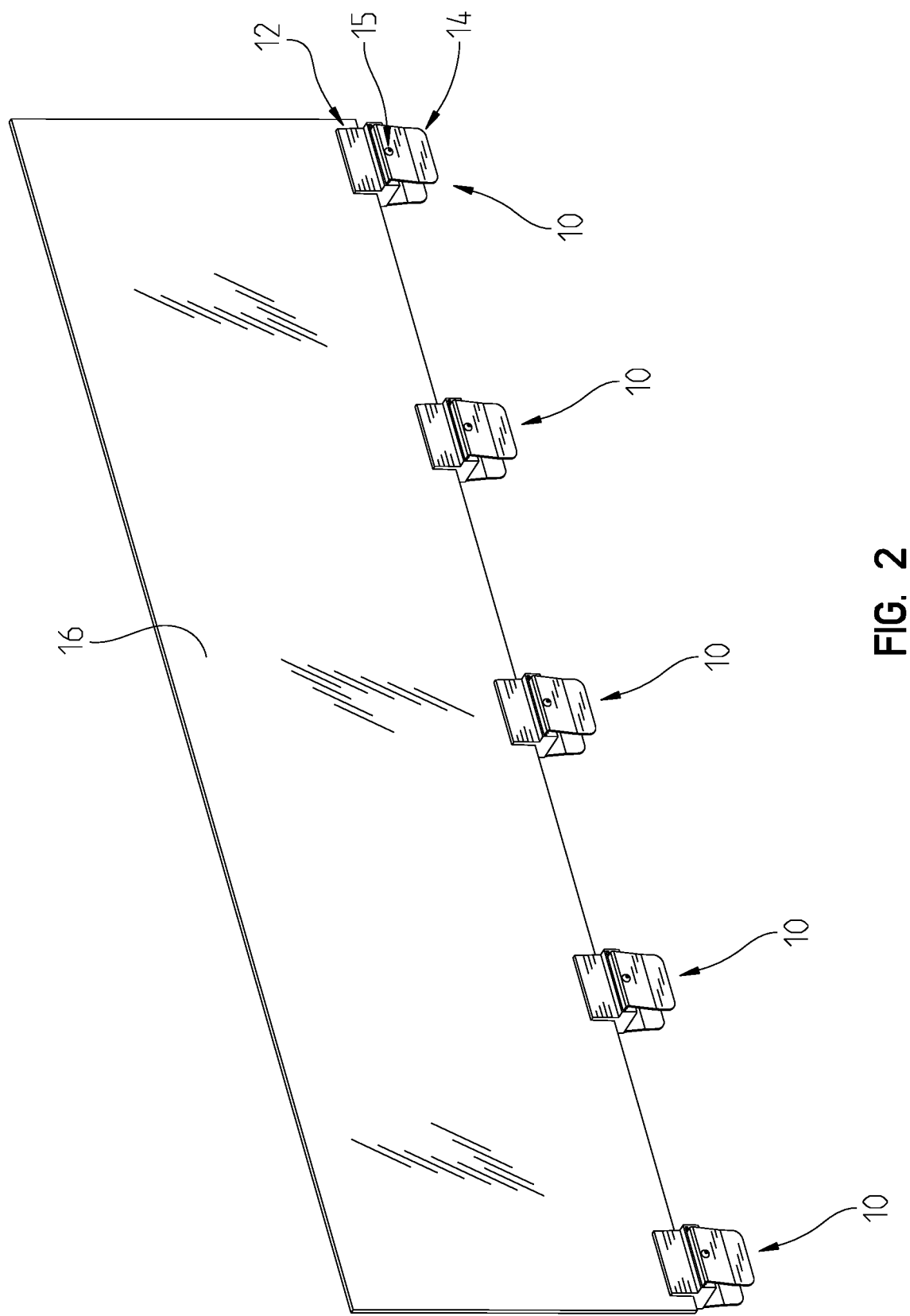
FIG. 2 illustrates a perspective view of an embodiment of a glass panel with a plurality of brackets engaged thereto in accordance with the present disclosure.
Figure 3:
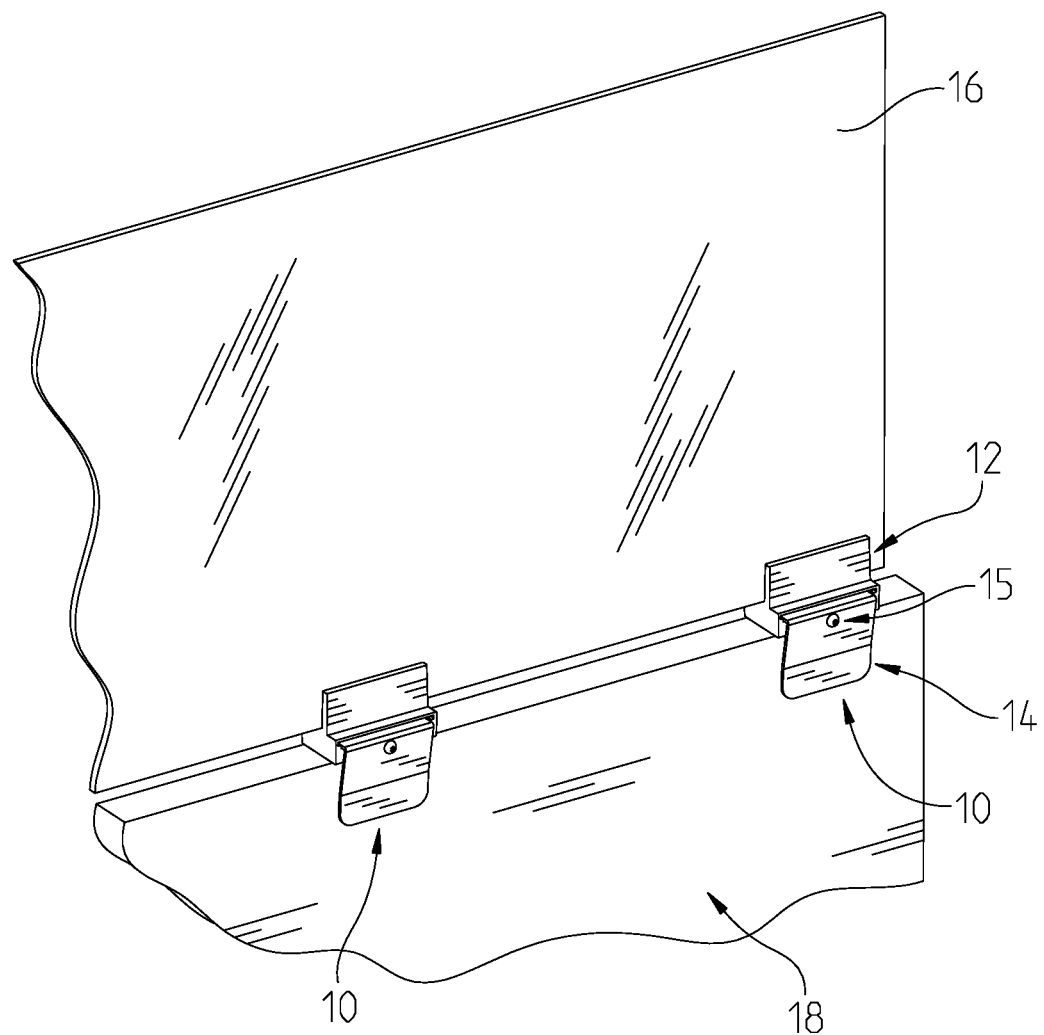
FIG. 3 illustrates a perspective view of an embodiment of a glass panel mounted to a modular desk system via a plurality of brackets in accordance with the present disclosure.

FIG. 1 shows an exemplary embodiment of an adjustable bracket 10 for mounting a panel (see FIG. 2). The adjustable bracket 10 includes a panel contact member 12, clamp members 14, and a securing member 15. The panel contact member 12 is operable to interface with a panel 16 (e.g., a glass panel, for example as shown in FIGS. 2 and 3). The clamp members 14 are operable to interface with a mounting surface 18 to which the panel can be mounted (e.g., a modular workspace wall, for example, shown in FIG. 3). The securing member 15 is operable to secure the adjustable clamp members 14 to a desired position for coupling to the mounting surface 18. In some embodiments, a plurality of adjustable brackets 10 may be implemented to secure a panel 16.

Figure 4:
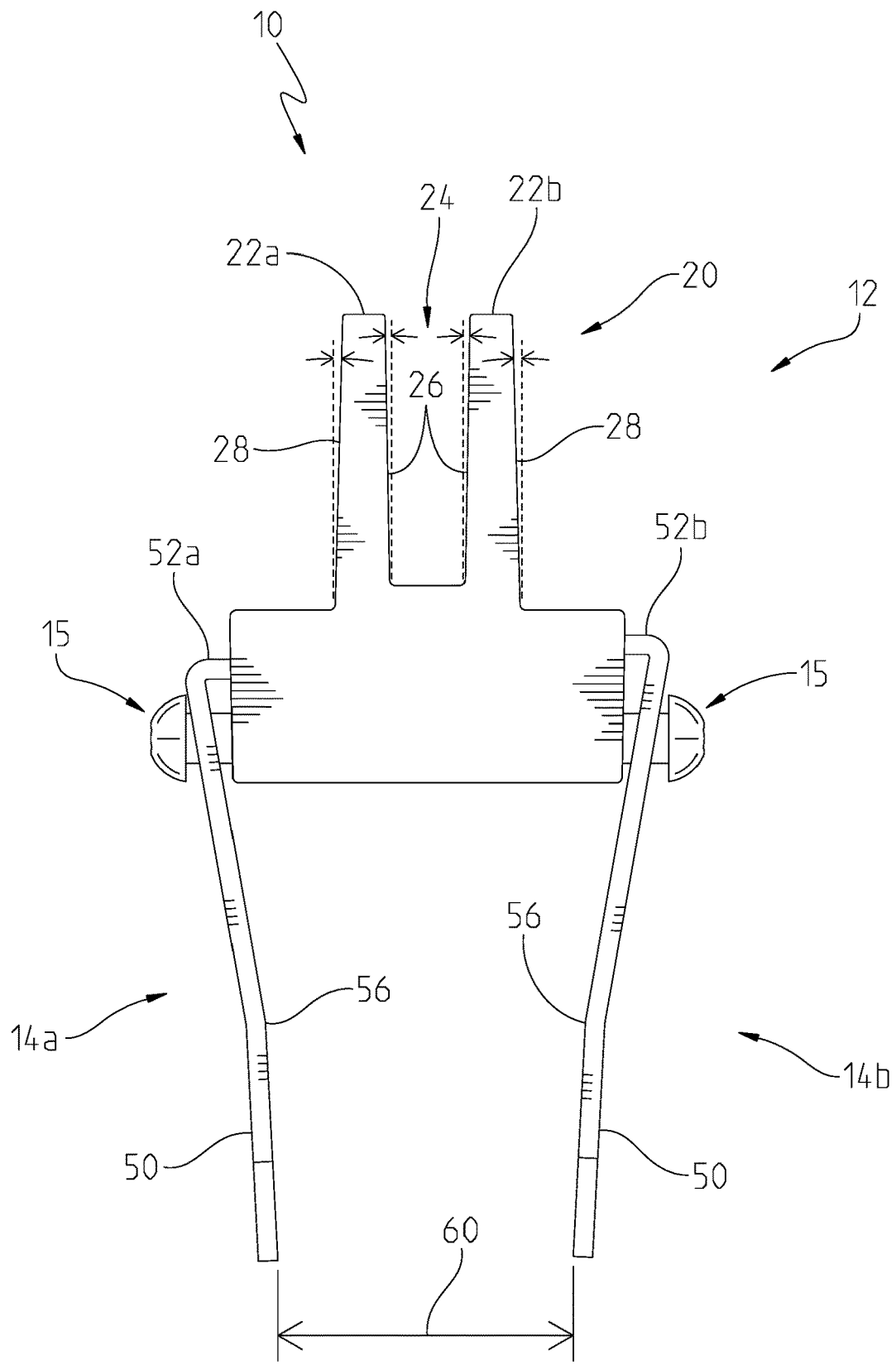
FIG. 4 illustrates a side view of an embodiment of a bracket in accordance with the present disclosure.

Referring to FIGS. 1 and 4, the panel contact member 12 includes a panel interface portion 20. In some embodiments, the panel interface portion 20 includes a first vertical member 22a and a second vertical member 22b. The first and second vertical members 22a, 22b are spaced from each other such that they form a panel receiver space 24, in some embodiments, a U-shaped channel. The first and second vertical member 22a, 22b each include an interface surface 26 that faces toward the other interface surface 26 across the panel receiver space 24. In some embodiments, the interface surfaces 26 are parallel to each other. In other embodiments, the interface surfaces 26 are angled relative to each other at about 0.1 degrees to about 25 degrees. In some embodiments the interface surfaces 26 are angled relative to each other at about 0.5 degrees to about 2 degrees. In some embodiments the interface surfaces 26 are angled relative to each other at about 1 degree. In order to secure the panel 16 (FIG. 2) within the panel receiver space 24 when the interface surfaces 26 are angled relative to each other, a shim (not shown) may be inserted between the panel 16 and the interface surfaces (e.g., a foam shim for glass). In some embodiments, the first and second vertical members 22a, 22b may also include exterior surfaces 28, each having a draft angle of about 1 degree.

Figure 5A:
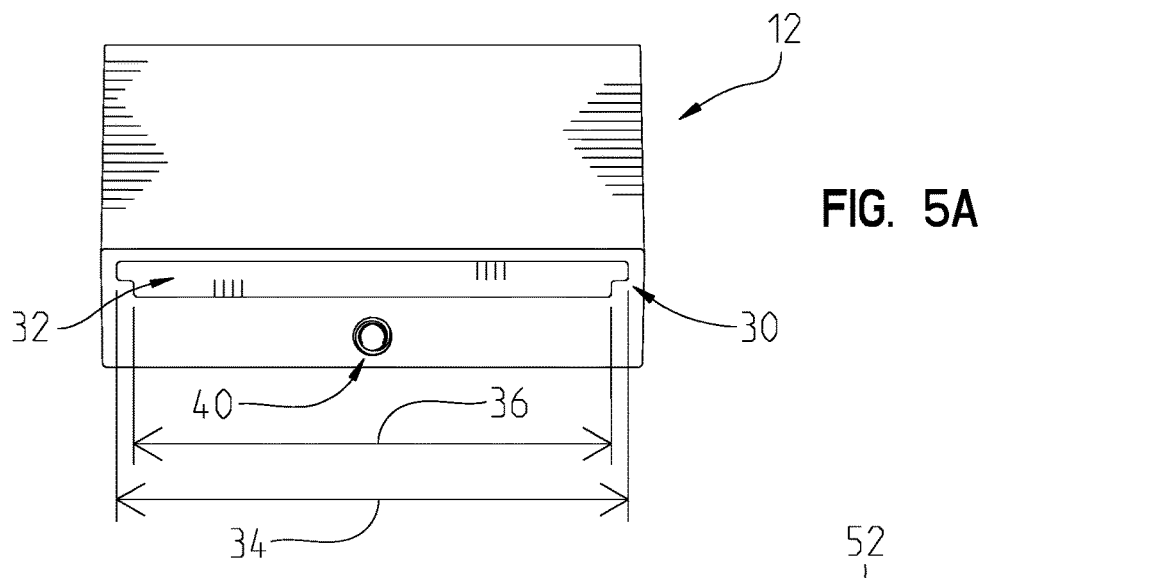
FIG. 5A illustrates a side view of an embodiment of a panel contact member of a bracket in accordance with the present disclosure.

Referring now to FIGS. 1 and 5A, the panel contact member 12 further includes a clamp interface portion 30. The clamp interface portion 30 is operable to interface with the clamp member 14 as will be discussed hereafter. In some embodiments, the clamp members 14 are removable from the panel contact member 12. The clamp interface portion 30 is operable to interface with and retain the clamp members 14 when in use. For example, in one embodiment, the clamp interface portion 30 includes a channel 32 extending into the panel contact member 12 for receiving a portion of the clamp members 14. In some embodiments, the channel 32 extends through the panel contact member 12. The clamp members 14 may be received into the channel 32 in a sliding relationship, allowing the clamp members 14 to be adjusted to correspond to varying thicknesses of the mounting surface 18.

As is shown in FIG. 5A, the channel 32 includes a wide portion 34 and a narrow portion 36. Each clamp member 14 may be appropriately sized to be received in either the wide portion 34 or the narrow portion 36 of the channel 32. By having specific clamp members that are receivable within a specific portion (e.g., wide portion 34 or narrow portion 36) of the channel 32, the clamp members 14 are inserted into the appropriate portion of the channel 32 such that components of the clamp members 14 align for fastening the clamp members 14 at a predetermined position, as will be described hereafter. Alternative methods and designs for keying the channel 32 and clamp members 14 are likewise contemplated in the disclosure, including providing more than one channel (e.g., separate channels), having keyed profiles such as notches, and so forth.

As is further shown in FIG. 5A, the panel contact member 12 further includes a securing portion 40 operable to receive the securing member 15. The securing portion 40 facilitates the securement of the clamp members 14 to the panel contact member 12 at a desired relative position. In some embodiments, the securing portion 40 includes a threaded aperture. The threaded aperture is operable to receive the securing member 15 (e.g., a bolt or set screw). Alternative methods and designs for securing the clamp members 14 to the panel contact member 12 are contemplated, including a tab for providing mechanical interference, a ratchet for cinching the clamp members 14 on the mounting surface 18, and so forth. Whichever securing member 15 is implements, the securing portion 40 of the panel contact member 12 includes corresponding structure (e.g., tab receivers, apertures, and so forth) for interfacing with the securing member 15.

Turning now to a discussion of the clamp members 13, FIGS. 1, 4, 5B, 5C, and 6 demonstrate exemplary embodiments of clamp members 14. In one embodiment, clamp members 14 include a surface contact portion 50 and an adjustable portion 52. The surface contact portion 50 is operable to interface with the mounting surface 18 (e.g., a modular workspace wall, for example, shown in FIG. 3). The adjustable portion 52 is operable to be positioned at various positions to accommodate various thicknesses of surfaces 18. In some embodiments, the adjustable portion 52 is infinitely adjustable to any position within a set parameter. In other embodiments, the adjustable portion 52 is adjustable to a predetermined number of positions, for example, three predetermined positions each about 0.25 inches apart.

Figure 5B:
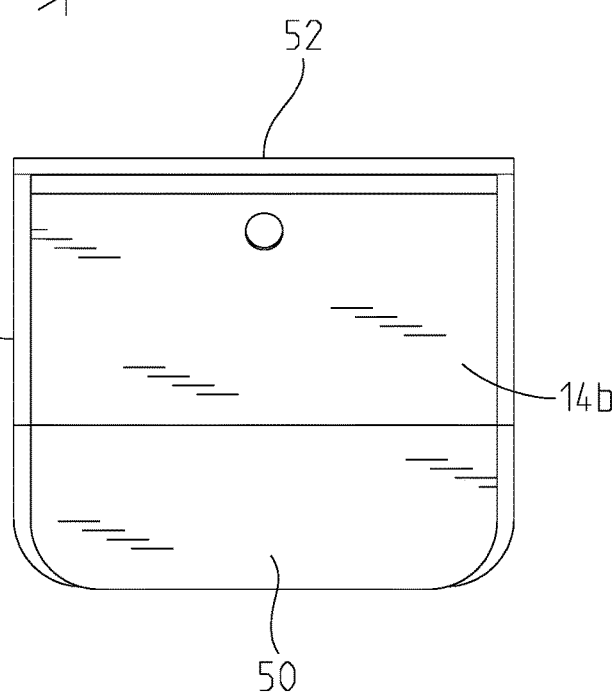
FIG. 5B illustrates a side view of an embodiment of clamp members and a securing member of a bracket an accordance with the present disclosure.
Figure 5C:
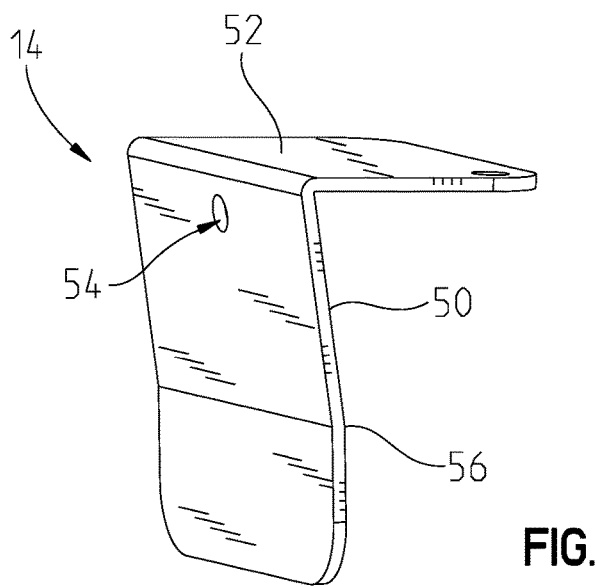
FIG. 5C is a perspective view of an embodiment of a clamp member of a bracket in accordance with the present disclosure.
Figure 6:
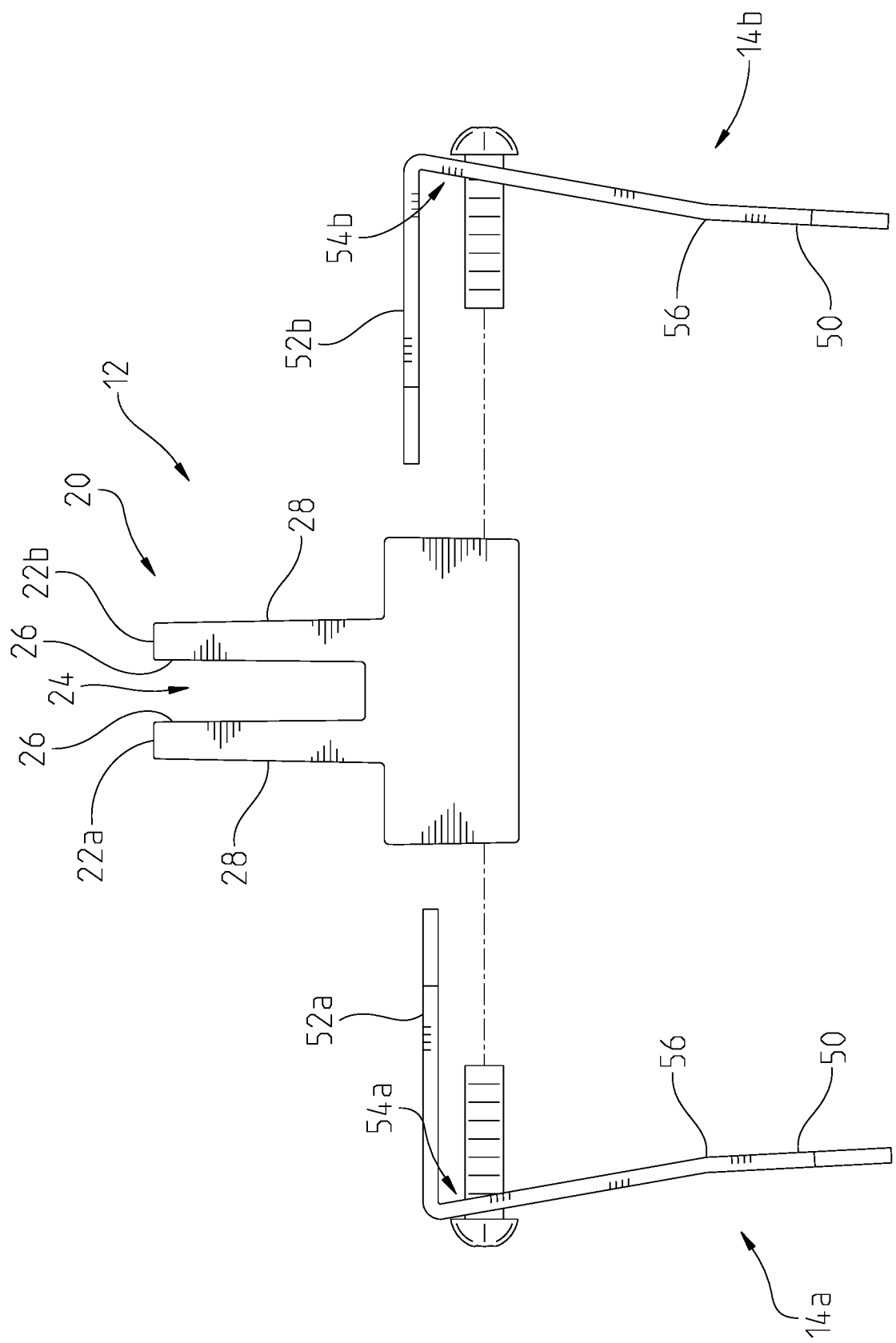
FIG. 6 is an exploded view of an embodiment of an adjustable bracket in accordance with the present disclosure.

Referring to FIGS. 5C and 6, in some embodiments the clamp members 13 are in the form of a substantially L-shaped bracket. For example, the adjustable portion 52 may comprise a first section of the L-shaped bracket and the surface contact portion 50 may comprise a second section of the L-shaped bracket. In these embodiments, the surface contact portion 50 and the adjustable portion 52 may be positioned at about 90 degrees relative to each other. For example, in some embodiments, the surface contact portion 50 and the adjustable portion 52 are positioned from about 75 to about 105 degrees relative to each other. The embodiment shown in FIG. 6, for example, includes a surface contact portion 50 and an adjustable portion 52 that are positioned at about an 80-degree angle relative to each other. This may be accomplished by providing a 100-degree bend in a piece of sheet metal.

The adjustable portion 52 is operable to interface with the panel contact member 12 via the clamp interface portion 30. In some embodiments where the clamp interface portion 30 includes a channel 32, the adjustable portion 52 of the clamp member 14 may be received into the channel 32. As shown in FIG. 5B, each of the clamp members 14a, 14b have different widths. For example, the first clamp member 14a is wider than the second clamp member 14b. Thus, each of the clamp members 14a, 14b correspond to a specific portion of the interface portion 30 (e.g., narrow portion 36 or wide portion 34, see FIG. 5A). As previously discussed, each clamp member 14 may include a key that corresponds to the interface portion 30 to ensure that the clamp members 14 are appropriately placed and positioned. By providing a specific key (e.g., varying widths of the clamp members 14, more specifically the adjustable portion 52 of the clamp members 14), the adjustable portions 52 of the respective clamp members 14 may be engaged with the panel contact member 12 at varying elevations. This allows the adjustable portions 52 to overlap along the depth of the panel contact member 12. By overlapping the adjustable portion 52 along the depth of the panel contact member 12, the adjustable portions 52 can extend farther and consequently provide greater stability against movement (e.g., pivoting or bending) of the adjustable portions 52 and consequently the entire body of the clamp members 14.

Referring to FIG. 5C, the clamp members 14 include an aperture 54. In the embodiment shown, the aperture 54 is formed through the surface contact portion 50. The aperture 54 may be used to pass a securing member 15 through the clamp member 14. For example, in those embodiments in which the securing member 15 includes a bolt, the bolt may pass through the aperture 54 of the clamp member 14. The bolt may then be fastened to the panel interface portion 20 via the securing portion 40. As the bolt is advanced further into the securing portion 40 of the panel contact member 12, the clamp member 14 is further advanced inwardly. This allows for the clamp members 14 to be adjusted to an appropriate width for maintaining secure contact with the mounting surface 18 (e.g., a wall). With reference to FIG. 4, in some embodiments, the respective apertures 54 of the clamp members 14 may be positioned through the surface contact portion 50 at non-equivalent positions when the adjustable portions 52 are inserted into the panel contact member 12 at different elevations (e.g., for allowing overlap of the adjustable portions along the depth of the panel contact member 12). For example, as shown, the first clamp member 14a includes an aperture 54a that is positioned closer to its adjustable portion 52a relative to the aperture 54b of the second clamp member 14b to its adjustable portion 52b. By positioning the apertures 54 in this manner, the apertures 54 align with the securing portion 40 of the panel contact member 12 regardless of which side the clamp members 14 are implemented relative to the panel contact member 12 (when the adjustable portion 52 of the clamp members 14 are keyed to be inserted at specific elevations relative to the panel contact member 12).

Referring to FIGS. 4, 5C, and 6, the surface contact portion 50 may further include a bend 56. The bend 56 may be about a 7-degree bend resulting in an about 173-degree angle formed by the surface contact portion 50. In some embodiments, the bend 56 may be about 20 degrees, about 15 degrees, about 10 degrees, or about 5 degrees. As the clamp members 14 are secured to the mounting surface 18, the surface contact portion 50 interfaces with the mounting surface 18. In those embodiments in which the mounting surface 18 is a plush or pliant surface, the mounting surface 18 may partially compress as the clamp members 14 are advanced. In some embodiments, the clamp members 14 are formed of a rigid sheet metal and therefore form a tight contact with the mounting surface 18. In other embodiments, the clamp members 14 may be formed so as to flex to allow for the surface contact portion 50 to be in contact with the mounting surface 18 over a greater surface area to maintain increased contact.

As previously discussed, the securing member 15 is provided to secure the clamp members 14 at specific positions. The securing member 15, in some embodiments, may be operable to secure the clamp members 14 an infinite number of positions within a predefined range. For example, in those embodiments where the securing member 15 includes a bolt or a set screw, the securing member 15 may be advanced to secure against the clamp member 14. The securing member 15 may advance in the same direction in which the clamp members 14 are adjustable. For example, when the surface contact portions 50 of the clamp members 14 are substantially facing each other, the securing member 15 may be positioned substantially perpendicular to the surface contact portions 50. As the securing member 15 is further advanced, the clamp members 14, and more specifically the surface contact portions 50 of the clamp members 14, may be further advanced and secured against the mounting surface 18. This allows the actual advancing of the securing member 15 to further tighten the clamp members 14 against the mounting surface 18 rather than relying on positioning the clamp members 14 against the mounting surface 18 and then securing the clamp members 14 at that position. The securing member 15 exerts a force on the clamp members 14 that is generally oriented in the same direction as the surface contact portion 50 of the clamp member 14 when engaged with the mounting surface 18. Thus, as the securing member 15 is adjusted to varying lengths relative to the panel contact member 12, the clamp members 14 are adjustable to increase or decrease a depth of the clamp space 60, such that the change in the depth of the clamp space 60 is proportional to a change in the varying lengths of the securing member 15. Furthermore, this allows for the clamp members 14 to be more firmly secured in place as the bolt or set screw would have to be advanced backwards for the clamp members 14 to release, rather than relying solely on the friction between the securing member 15 and the clamp members 14. Stated otherwise, the securing member 15 implements mechanical interference between the securing member 15 and the clamp members 14 rather than friction between the securing member 15 and the clamp members 14 for resisting backing out of the clamp members 14 from the panel contact member 12.

As is shown in FIG. 4, a bracket 10 may implement a first clamp member 14a and a second clamp member 14b. A clamp space 60 is formed between the first and the second clamp members 14a, 14b. Because one or both of the clamp members 14a, 14b are adjustable, the clamp space 60 may be adjustable to accommodate surfaces (e.g., mounting surface 18, for example, a wall) of varying thicknesses. The various bends in the clamp members 14 are operable to provide increased traction or hold to limit translation or rotation of the bracket 10 relative to the mounting surface 18. In those embodiments in which the clamp members 14 are operable to flex, increased traction may be obtained on certain mounting surfaces 18. Furthermore, the bends in the clamp members 14 may allow for the clamp members 14 to contact a mounting surface 18 that is irregular in shape or material properties (e.g., the mounting surface may include portions formed of stiff metals with plush or more pliant portions, for example modular work space frames and walls).

Figure 7A:
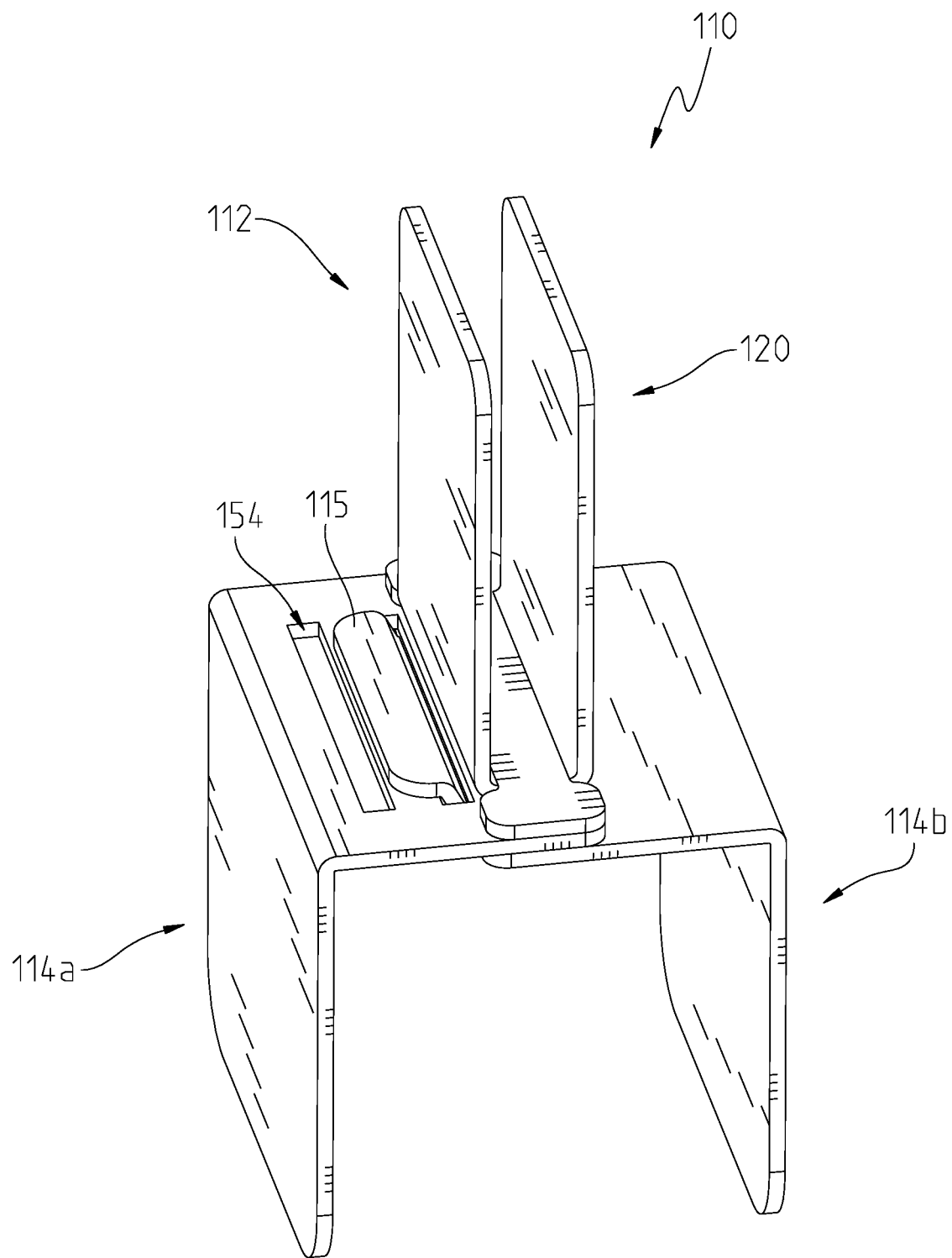
FIG. 7A is a perspective view of an embodiment of an adjustable bracket having a fixed clamp member and an adjustable clamp member in accordance with the present disclosure.
Figure 7B:
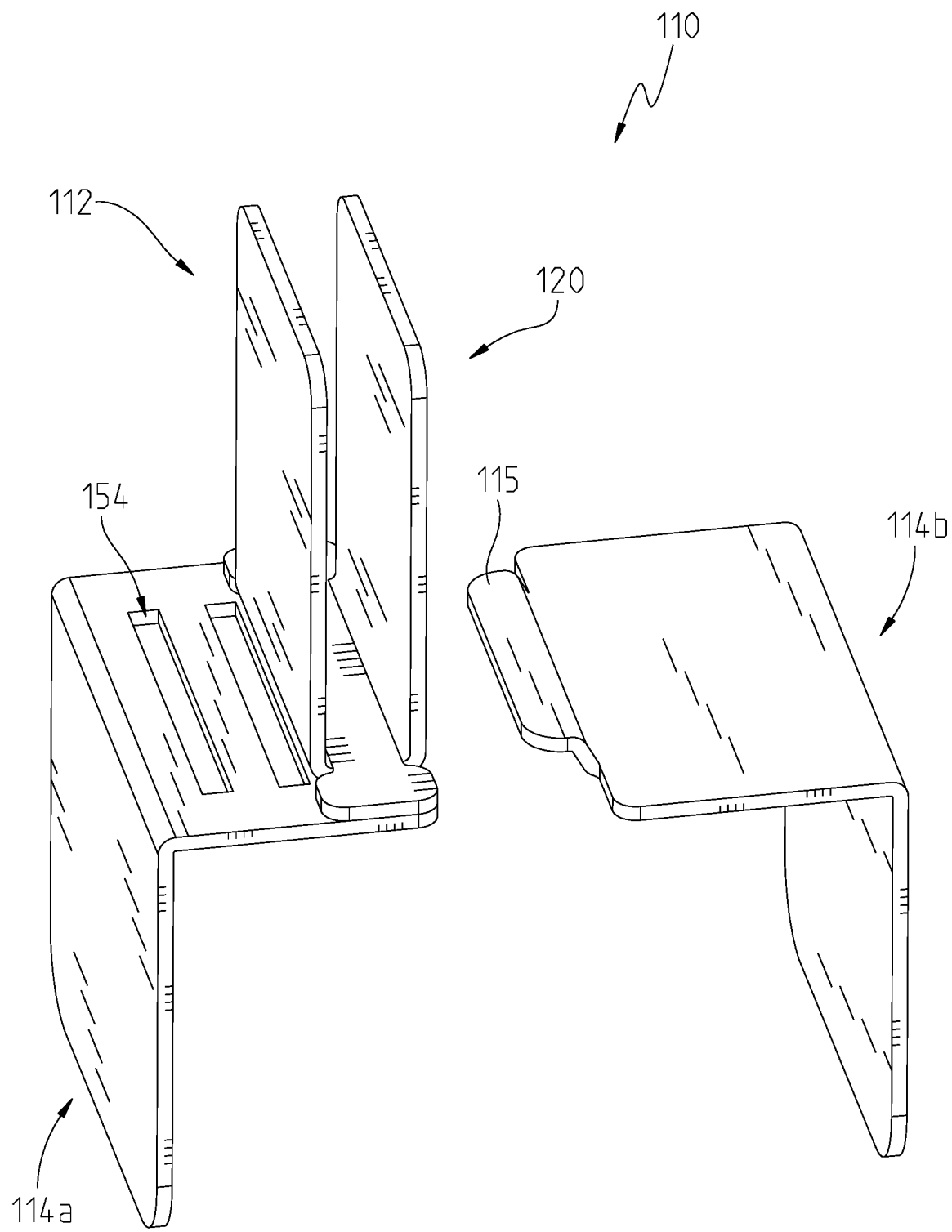
FIG. 7B is an exploded view of an embodiment in accordance with FIG. 7A.

In some embodiments, at least one of the clamp members 14 is fixed or stationary and at least one of the clamp members 14 is adjustable. For example, one of the clamp members may be affixed to the panel contact member 12 (e.g., welding, adhesives, or cast to form a single unit). In some embodiments, and referring to FIGS. 7A and 7B, a bracket 110 includes a panel contact member 112 with a first clamp member 114a that is fixedly engaged thereto and a second clamp member 114b that is adjustably coupled thereto. The first clamp member 14a includes apertures 154 through which a securing member 115 (e.g., a tab extending from the second clamp member 114b) may pass and engage the first clamp member 114a with the panel contact member 112. In this embodiment, the first clamp member 114a may include a plurality of apertures 154 spaced along the first clamp member 114a through which the securing member 115 may pass and engage. The bracket 110 may also be configured such that the apertures 154 are positioned on the second clamp member 114b and the securing member 115 extends from the first clamp member 114a and the panel contact member 112. In this embodiment, the adjustability of the clamp members is finite and relative to the number of apertures provided.

Figure 8:
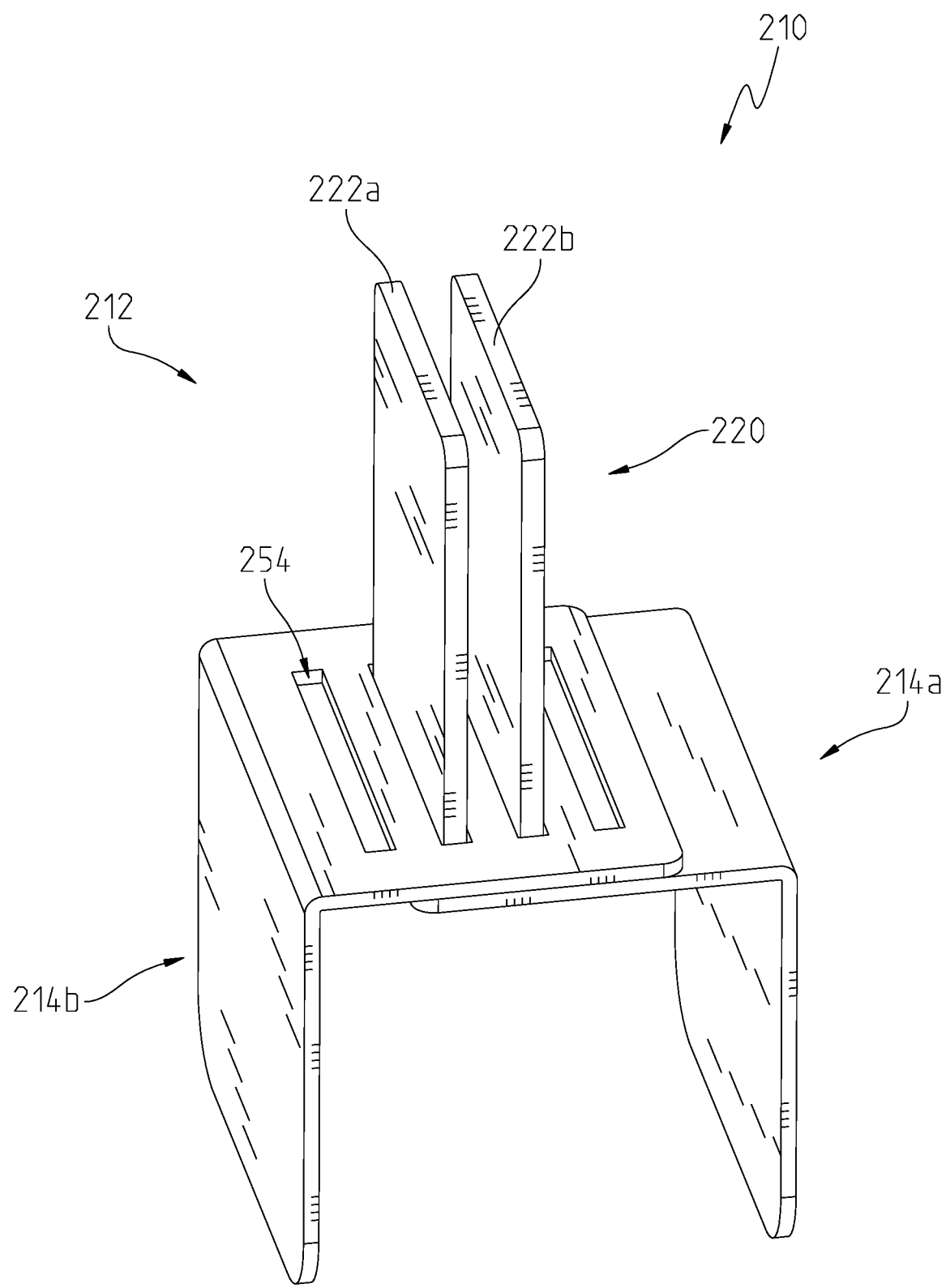
FIG. 8 is a perspective view of an alternative embodiment of an adjustable bracket having a fixed clamp member and an adjustable clamp member in accordance with the present disclosure.

In another embodiment, as shown in FIG. 8, a bracket 210 is provided such that a panel contact member 212 is fixedly engaged with a first clamp member 214a and a second clamp member 214b is adjustably coupled thereto. The second clamp member 214b includes a plurality of apertures 254 through which vertical members 222a, 222b of the panel contact member 212 can extend. A clamp space 260 may be adjusted based on the apertures 254 through which the first and second vertical members 222a, 222b extend.

In another embodiment, as shown in FIGS. 9 and 10, a bracket 310 is provided such that a panel contact member 312 includes a securing portion 340 operable to receive a securing member 315 in a substantially vertical direction. In this embodiment, apertures 354 of the clamp members 314a, 314b may be formed in the clamp interface portion 330. The securing portion 340 is operable to align with the apertures 354 such that the securing member 315 may be positioned through the securing portion 340 of the panel contact member 312 and through the aperture 354 of the clamp member, thus providing mechanical interference against movement of the clamp members 314a, 314b relative to the panel contact member 312.

It will be apparent to those skilled in the art that various modifications and variations can be made in the present disclosure without departing from the spirit and scope of the disclosure. Thus, it is intended that the present disclosure cover the modifications and variations of this disclosure provided they come within the scope of the appended claims and their equivalents.

Likewise, numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications may be made, especially in matters of structure, materials, elements, components, shape, size and arrangement of parts including combinations within the principles of the disclosure, to the full extent indicated by the broad, general meaning of the terms in which the appended claims are expressed. To the extent that these various modifications do not depart from the spirit and scope of the appended claims, they are intended to be encompassed therein.

The following is claimed:

1. A bracket for securing a panel comprising:
    a panel contact member for receiving the panel, the panel contact member including an interface portion;
    a first clamp member having a first clamp surface contact portion and a first clamp adjustable portion operable to interface with the panel contact member interface portion;
    a second clamp member having a second clamp surface contact portion positioned such that the second clamp surface contact portion is facing toward the first clamp surface contact portion of the first clamp when the first clamp adjustable portion is interfacing with the panel contact member interface portion, such that the first clamp surface contact portion and the second clamp surface contact portion are facing inward towards each other; and
    wherein the panel contact member interface portion forms a through channel in the panel contact member substantially perpendicular to the first and second clamp surface contact portions, the through channel operable to receive the first clamp adjustable portion; and
    a securing member operable to secure the first clamp member to the panel contact member at a location on the panel contact member that is spaced-apart from the through channel in the panel contact member, the securing member positioned substantially perpendicular to the first and second clamp surface contact portions when securing the first clamp member to the panel contact member.

2. The bracket of claim 1, wherein the first clamp adjustable portion defines an aperture, wherein the panel contact member includes threading, and wherein the securing member includes a set screw, a portion of the set screw operable to pass through the aperture of the first clamp member and to be threaded with the threading of the panel contact member.

3. The bracket of claim 1, wherein the second clamp member has a second clamp adjustable portion operable to interface with the panel contact member interface portion.

4. The bracket of claim 3, wherein the through channel is operable to adjustably receive the first clamp adjustable portion and the second clamp adjustable portion.

5. The bracket of claim 4, wherein the first clamp adjustable portion is wider than the second clamp adjustable portion, and wherein the panel contact member interface portion has a first clamp receiver portion that is wider than a second clamp receiver portion.

6. The bracket of claim 5, wherein the first clamp adjustable portion defines a first aperture and the second clamp adjustable portion defines a second aperture, wherein the panel contact member includes a first threading and a second threading, and wherein the securing member includes a first set screw and a second set screw, the first set screw operable to pass through the first aperture of the first clamp member and to be threaded with the first threading of the panel contact member and the second set screw operable to pass through the second aperture of the second clamp member and to be threaded with the second threading of the panel contact member.

7. The bracket of claim 6, wherein the first clamp surface contact portion and the first clamp adjustable portion form an 80-degree angle and the second clamp surface contact portion and the second clamp adjustable portion form an 80-degree angle.

8. The bracket of claim 7, wherein the first clamp surface contact portion includes a bend of about 7 degrees and the second clamp surface contact portion includes a bend of about 7 degrees.

9. The bracket of claim 1, wherein the first clamp surface contact portion is operable to be advanced in a first direction, and wherein the securing member is operable to be advanced in the first direction.

10. A panel assembly for mounting to a modular furniture system, the panel assembly comprising:
    a panel; and
    a bracket including a panel contact member for receiving the panel, a plurality of clamp members having clamping surfaces facing substantially inward toward each other and defining a clamping space for receiving a portion of the modular furniture system, at least one of the plurality of clamp members being an adjustable clamp member to increase or decrease a depth of the clamping space, the plurality of clamp members operable to interface with the panel contact member, and a securing member operable to be adjusted to varying lengths relative to the panel contact member such that a change in the depth of the clamp space is proportional to a change in the varying lengths of the securing member, and wherein each of the plurality of clamp member includes a clamp adjustable portion defining an aperture, wherein the panel contact member includes a first threading and a second threading, and wherein the securing member includes a first set screw and a second set screw, the first set screw operable to partially pass through the aperture of a first clamp member and to be threaded with the first threading of the panel contact member and the second set screw operable to partially pass through the aperture of a second clamp member and to be threaded with the second threading of the panel contact member.

11. The panel assembly of claim 10, wherein the plurality of clamp members are L-shaped brackets.

12. The panel assembly of claim 10, wherein at least one of the plurality of clamp members is a fixed, clamp member.

13. The panel assembly of claim 10, wherein each of the plurality of clamp members is an adjustable clamp member.

14. The panel assembly of claim 10, wherein the panel contact member has a first vertical portion defining a first panel contacting surface and a second vertical portion defining a second panel contacting surface, the first and second vertical portions forming a channel for receiving the panel.

15. The panel assembly of claim 14, wherein the securing member is positioned horizontally.

16. The panel assembly of claim 10, wherein the plurality of clamp members include a first, clamp member and a second clamp member, the first clamp member including a first clamp adjustable portion that is received by the panel contact member and the second clamp member having a second clamp adjustable portion that is received by the panel contact member.

17. The panel assembly of claim 16, wherein the first clamp adjustable portion and the second clamp adjustable portion are at least partially overlapping along the depth of the clamp space.

* * * * *